(12) United States Patent
Nowak et al.

(10) Patent No.: US 8,286,803 B2
(45) Date of Patent: Oct. 16, 2012

(54) METHODS AND SYSTEMS FOR INCORPORATING CARBON NANOTUBES INTO THIN FILM COMPOSITE REVERSE OSMOSIS MEMBRANES

(75) Inventors: Andrew P. Nowak, Santa Monica, CA (US); Larken E. Euliss, Westlake Villiage, CA (US)

(73) Assignee: The Boeing Company, Chicago, IL (US)

( * ) Notice: Subject to any disclaimer, the term of this patent is extended or adjusted under 35 U.S.C. 154(b) by 502 days.

(21) Appl. No.: 12/487,531

(22) Filed: Jun. 18, 2009

(65) Prior Publication Data

US 2010/0320140 A1    Dec. 23, 2010

(51) Int. Cl.
*B01D 29/05* (2006.01)
*B01D 39/00* (2006.01)
(52) U.S. Cl. .............. 210/490; 210/500.37; 210/500.38; 977/882; 977/883; 977/962; 977/902; 156/279
(58) Field of Classification Search .................. 156/279; 977/882, 883, 902, 962; 210/500.37, 500.38, 210/490; 427/244
See application file for complete search history.

(56) References Cited

U.S. PATENT DOCUMENTS

| | | | |
|---|---|---|---|
| 4,277,344 A | 7/1981 | Cadotte | |
| 6,162,358 A * | 12/2000 | Li et al. | 210/500.38 |
| 6,783,746 B1 * | 8/2004 | Zhang et al. | 423/447.1 |
| 6,837,381 B2 | 1/2005 | Hirose | |
| 7,211,320 B1 * | 5/2007 | Cooper et al. | 428/306.6 |
| 2006/0207931 A1 * | 9/2006 | Liang et al. | 210/500.21 |
| 2008/0237126 A1 | 10/2008 | Hoek et al. | |

FOREIGN PATENT DOCUMENTS

| | | |
|---|---|---|
| WO | 2004046031 A1 | 6/2004 |
| WO | 2008028155 A2 | 3/2008 |
| WO | 2009035415 A1 | 3/2009 |
| WO | 2009129354 A2 | 10/2009 |
| WO | 2009148959 A2 | 12/2009 |
| WO | 2010002805 A1 | 1/2010 |

OTHER PUBLICATIONS

Matsui, J. et al; Fabrication of Densely Packed Multi-Walled Carbon Nanotube Ultrathin Films using a Liquid-Liquid Surface; Journal of Materials Chemistry; 2007; pp. 3806-3811; vol. 17; The Royal Society of Chemistry.

Peinemann, K. et al.; Assymetric Superstructure Formed in a Block Copolymer Via Phase Separation; Nature Materials; Dec. 2007; pp. 992-996; vol. 6; Nature Publishing Group.

(Continued)

*Primary Examiner* — Walter D Griffin
*Assistant Examiner* — Denise R Anderson
(74) *Attorney, Agent, or Firm* — Armstrong Teasdale LLP

(57) ABSTRACT

A method for fabricating a reverse osmosis membrane is described. The method includes aligning a plurality of carbon nanotubes at the interface of two liquids, the first liquid being an aqueous layer, and the second layer being an organic layer that is immiscible to the aqueous layer, forming a thin layer selective membrane around the aligned carbon nanotubes at the interface of the two liquids, and bonding the thin layer selective membrane/carbon nanotube composite onto a structural support layer.

16 Claims, 8 Drawing Sheets

OTHER PUBLICATIONS

Yang, S. et al.; Nanporous Membranes with Ultrahigh Selectivity and Flux for the Filtration of Viruses; Advanced Materials; 2006; pp. 709-712; vol. 18; Wiley-VCH Verlag GmbH & Co. KGaA, Weinheim.

Jeong, B. et al; Interfacial Polymerzation of Thin Film Nanocomposites: A New Concept for Reverse Osmosis Membranes; Journal of Membrane Science; 2007; pp. 1-7; vol. 294; Elsevier.

Shannon, M. et al.; Science and Technology for Water Purification in the Coming Decades; Nature; Mar. 2008; pp. 301-310; vol. 452; Nature Publishing Group.

Strathmann, H.; Synthetic Membranes and Their Preparation; Handbook of Industrial Membrane Technology; 1990; pp. 1-60; Noyes Publications.

Petersen, R. et al.; Thin Film Composite Reverse Osmosis Membranes; Handbook of Industrial Membrane Technology; 1990; pp. 307-348; Noyes Publications.

Kaira, A. et al.; Osmotic Water Transport Through Carbon Nanotube Membranes; PNSA; Sep. 2, 2003; pp. 10175-10180; vol. 100, No. 18.

Corry, B.; Designing Carbon Nanotube Membranes for Efficient Water Desalination; Journal of Physical Chemistry; 2008; pp. 1427-1434; vol. 112, No. 5; American Chemical Society.

Chen, H.; Predictions of Selectivity and Flux for CH4/H2 Separations Using Single Walled Carbon Nanotubes as Membranes; Journal of Membrane Science; 2006; pp. 152-160; vol. 269; Elseveir.

Majumder, M. et al.; Enhanced Flow in Carbon Nanotubes; Nature; Nov. 2005; p. 44; vol. 438; Nature Publishing Group.

Hinds, B. et al.; Aligned Multiwalled Carbon Nanotube Membranes; Science; 2004; pp. 62-65; vol. 303; American Association for the Advancement of Science.

Mi, W. et al.; Vertically Aligned Carbon Nanotube Membranes on Macroporous Alumina Supports; Journal of Membrane Science; 2007; pp. 1-7; vol. 304; Elsevier.

Choi, J. et al; Fabrication and Characterization of Multi-Walled Carbon Nanotubes/Polymer Blend Membranes; Journal of Membrane Science; 2006; pp. 406-415; vol. 284; Elsevier.

International Search Report and Written Opinion of PCT/US2010/036360 dated Sep. 21, 2010; 20 pages.

Matsui, J. et al; Assembly of Untreated Single-Walled Carbon Nanotubes at a Liquid-Liquid Interface; Carbon 47; 2009; pp. 1444-1450.

* cited by examiner

Addition of CNT in ethanol dispersion

Addition of water to ethanol dispersion

Microporous support film placed in aqueous layer

Add organic layer

Controlled addition of additional ethanol to aqueous layer

Formation of assembled carbon nanotube layer at organic-aqueous interface

Addition of multifunctional amine reactive component and multifunctional amine component to respective organic and aqueous layer In-situ formation of polyamide interfacial layer Raise microporous support to
membrane at organic-aqueous interface Raise membrane and microporous support into layer that
includes multifunctional amine reactive component

METHODS AND SYSTEMS FOR INCORPORATING CARBON NANOTUBES INTO THIN FILM COMPOSITE REVERSE OSMOSIS MEMBRANES

BACKGROUND

The field of the disclosure relates generally to reverse osmosis techniques, and more specifically, to methods and systems for incorporating carbon nanotubes into thin film composite reverse osmosis membranes.

The concept of reverse osmosis or the act of forcing a solution against a selective membrane while under pressure to separate solvent from solute has existed for many years. This technology was first made possible and practical through the fabrication of cellulose acetate based asymmetric membranes. Since this time, reverse osmosis membranes have been developed to tolerate wide ranges of pH, temperature, and exposure to harsh chemicals.

By far the most common application of reverse osmosis is in the desalination and purification of water, particularly seawater and water from brackish water sources. The components involved in a common reverse osmosis system are straightforward and involve a feed source, pretreatment filters, a pumping system to generate hydrostatic pressure, and the reverse osmosis separation membrane unit itself. While typical reverse osmosis membranes can demonstrate a rejection rate in excess of 99% for many ionic species, this high selectivity comes at a cost. High pressures are required across the membrane and generation of such pressures requires large energy inputs into the reverse osmosis system.

Common reverse osmosis membranes are produced by fabricating very dense, thin polymer membranes that act as the selective barrier to solutes in the feed source. Fabrication techniques for these membranes consist of two main strategies. Both involve the formation of an asymmetric membrane structure where the thin dense selective layer is adjacent to a thicker, more porous film that acts to provide structural integrity to the overall membrane.

The first style of membrane, sometimes referred to as asymmetric reverse osmosis membranes, uses a single polymer system and relies on precipitation or a phase inversion technique that coats a polymer film dissolved in solvent, and subsequently exposing the polymer film to a layer of nonsolvent. The region of the film closest to the interface precipitates a thin layer of material rapidly, while the underlying layer produces a more open porous network.

The second method relies on two separate polymer systems that are commonly known as thin film composite membranes. This second method utilizes separate production of both the thin selective portion of the membrane and the underlying structural layer as well as a mechanism to combine the two into a single multilayer composite. While this is a more complex approach than the single component asymmetric membrane, it offers a greater flexibility in designing overall membrane performance by selecting systems best suited to selective permeability and structural roles required in the overall membrane.

The mechanism of selectivity in a reverse osmosis membrane is from the percolation of water molecules through interstitial spaces between polymer chains. Current reverse osmosis membranes are composed purely of polymeric materials and have no discernable pore structure and as a result are able to exclude ions and other solutes carried by the water feedstock. Separation of water from solutes and impurities is produced by forcing water molecules through the interstitial spaces between polymer chains. However, the lack of a porous microstructure requires a large mechanical pressure across the membrane to overcome the frictional resistance to flow and produce an adequate flow rate. This high pressure requires a large energy input and is characteristic of reverse osmosis membranes in general. Mechanisms to reduce pressure and energy requirements and improve flow rate across the membrane while maintaining selectivity will directly affect cost and economic feasibility of applying reverse osmosis techniques to a wider range of applications.

Incorporation of aligned carbon nanotubes into polymeric membranes has been performed through chemical vapor deposition (CVD) growth of aligned membranes. These aligned carbon nanotubes are surrounded by a polymeric matrix through spin coating a polymer solution onto the carbon nanotube array. However, these techniques involve processes that are expensive, time consuming, and not easily scalable. Growing a film of aligned carbon nanotubes onto a substrate using CVD involves the coating of a substrate such as silicon or anodic alumina with a thin layer of iron. Upon heating, the iron separates into a uniform array of islands that act as nucleation points for growth of carbon nanotubes. A source of carbon such as ethane is then introduced into the chamber and the carbon nanotubes are grown from the surface upward creating a dense aligned array. This array can then be encased in a polymer film through spin coating techniques and the entire composite film removed from the substrate. While these techniques are capable of incorporating a dense layer of carbon nanotubes into a polymer membrane, the surrounding membrane material is not necessarily as selective to water as traditional reverse osmosis membranes.

At the same time, incorporating unaligned carbon nanotubes into membranes has been described as providing an improved performance over those membranes that do not incorporate carbon nanotubes. Unfortunately the thickness and porosity of the membranes that contain the unaligned carbon nanotubes makes them unsuitable for applications such as desalinization of seawater.

Recently, the description of a technique to assemble carbon nanotubes at an organic/water interface has bean reported. Briefly, carbon nanotubes are first dispersed in ethanol. This solution is then diluted with water, followed by addition of hexane to create an organic liquid/water interface. Addition of ethanol to this mixture at a controlled rate guides the assembly of carbon nanotubes into a thin film at the organic liquid/water interface.

BRIEF DESCRIPTION

In one aspect, a method for fabricating a reverse osmosis membrane is provided. The method includes aligning a plurality of carbon nanotubes at the interface of two liquids, the first liquid being an aqueous layer, and the second layer being an organic layer that is immiscible to the aqueous layer, forming a thin layer selective membrane around the aligned carbon nanotubes at the interface of the two liquids, and bonding the thin layer selective membrane/carbon nanotube composite onto a structural support layer.

In another aspect, a reverse osmosis membrane is provided that includes a plurality of aligned carbon nanotubes, a thin layer selective membrane formed around the aligned carbon nanotubes, and a microporous support structure bonded with said thin layer selective membrane.

In still another aspect, a method for fabricating a reverse osmosis membrane is provided. The method includes suspending carbon nanotubes within a first solution, adding a component to the first solution at a controlled rate such that the carbon nanotubes align at an interface between the first solution and a second solution, and adding at least one component to the first solution and at least one component to the second solution, thereby causing a thin layer selective membrane to form at the interface between the first solution and the second solution, and about the aligned carbon nanotubes.

The features, functions, and advantages that have been discussed can be achieved independently in various embodiments or may be combined in yet other embodiments further details of which can be seen with reference to the following description and drawings.

DETAILED DESCRIPTION

The disclosed embodiments relate to the incorporation of carbon nanotubes into traditional reverse osmosis membranes. The carbon nanotubes produce channels through the membrane that provide low resistance paths for water molecules while also prohibiting passage of ionic components and impurities. This reduction in resistance to flow results in a lower pressure required across the membrane which directly relates to the energy requirements necessary to purify water using these membranes.

More specifically, the carbon nanotube rods are suspended in a polymeric film which has a composition similar to traditional reverse osmosis membranes, ensuring the surrounding polymeric material retains the separation and selectivity found in currently used reverse osmosis membranes. As described further herein, the fabrication techniques used to concentrate and align the carbon nanotubes are based on the assembly of the carbon nanotubes at a liquid-liquid interface. As a result, the composite films that are generated are able to be produced in less time, are more scalable, and less expensive compared to current chemical vapor deposition methods.

The described embodiments allow for the production of large membranes at the increased scales required for commercialization of an effective economic solution to water purification through reverse osmosis membrane technologies.

Figure 1:
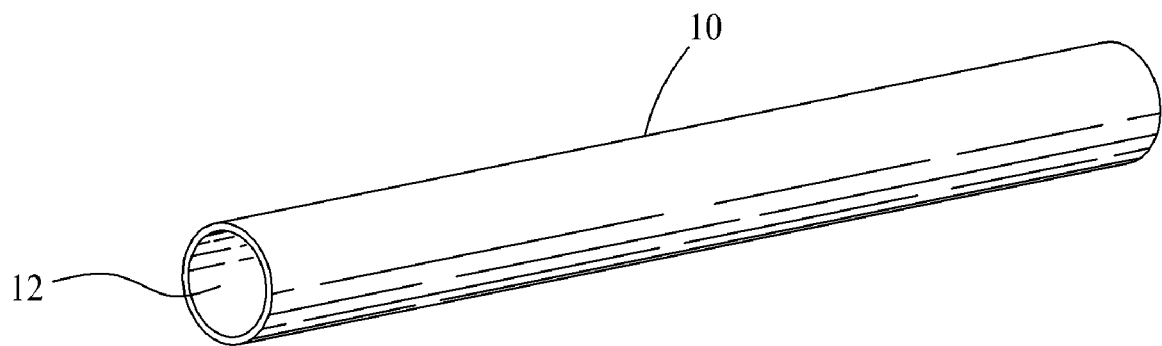
FIG. 1 is a depiction of a single carbon nanotube.

Referring now to the figures, FIG. 1 is a depiction of a single carbon nanotube 10. Carbon nanotube 10 has an elongated tubular structure including an opening 12 that extends the length of the nanotube 10. Carbon nanotube 10 is physically very small. The opening 12 within carbon nanotube 10 is of a size that it allows water molecules to pass through while blocking the passage of larger molecules and ions such as might be suspended within sea water or another brackish water source.

Figure 2:
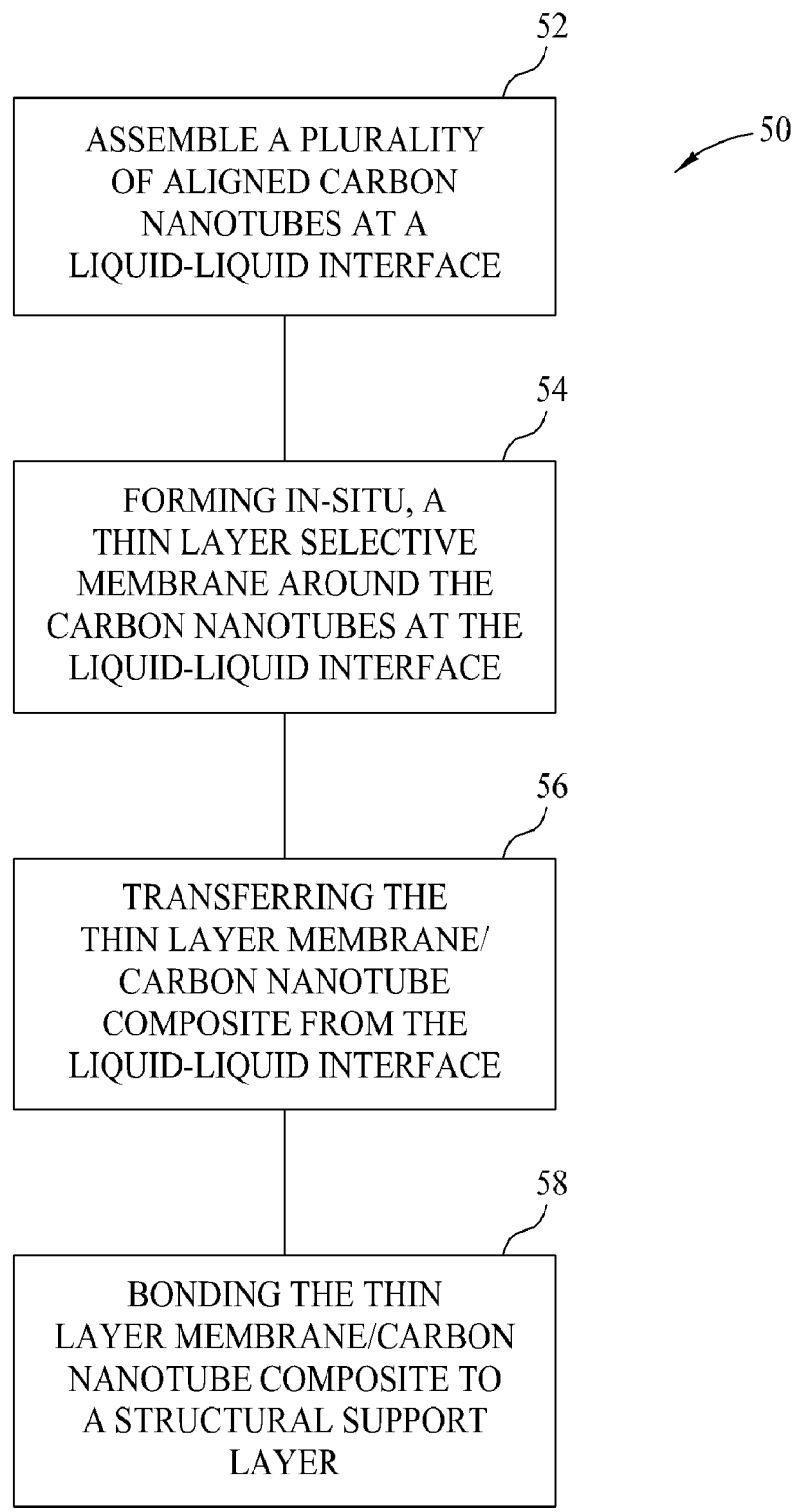
FIG. 2 is a flowchart that illustrates a composite reverse osmosis membrane incorporating carbon nanotubes fabrication process.

FIG. 2 is a flowchart 50 that describes fabrication of a composite reverse osmosis membrane incorporating carbon nanotubes. As further described herein, the membrane structure includes the carbon nanotubes to reduce flow resistance and reduce energy input, while the fabrication technique efficiently incorporates carbon nanotubes into the membrane. In one embodiment, the composite reverse osmosis membrane includes a semipermeable thin film and a microporous structural support, where the semipermeable thin film, or membrane, possesses the carbon nanotubes.

Referring to FIG. 2, the process includes assembling 52 a plurality of aligned carbon nanotubes at a liquid-liquid interface, then forming 54, in-situ, a thin layer selective membrane around the carbon nanotubes at the liquid-liquid interface. The process concludes by transferring the thin layer membrane/carbon nanotube composite from the liquid/liquid interface and laminating, or bonding 58, the thin layer membrane/carbon nanotube composite to an underlying structural support layer.

In an alternative method, the thin layer selective membrane may be formed using an interfacial technique. In this process, the porous structural support layer is first coated with a multifunctional amine, typically through a dip coating technique. The multifunctional amine may be introduced into the water layer in a separate step. The coated, supporting layer is then passed from the water/ethanol layer, through the liquid-liquid interface that contains the aligned carbon nanotubes, and into the immiscible organic layer. The organic layer includes a multifunctional amine reactive component in order to form a thin layer membrane to encapsulate the carbon nanotubes and bond it to the underlying support.

Figure 3:
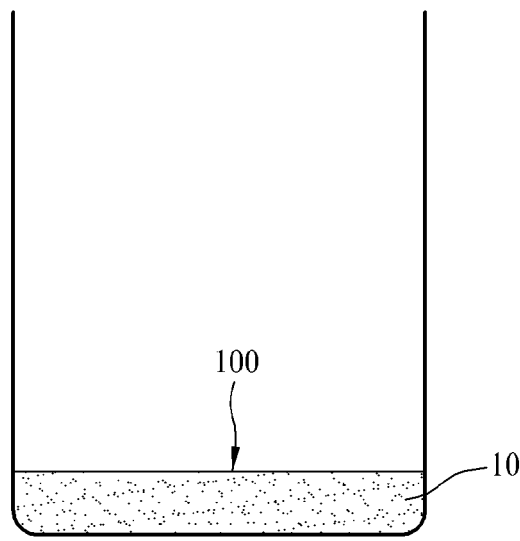
FIG. 3 depicts suspension of carbon nanotubes within an ethanol solution.
Figure 4:
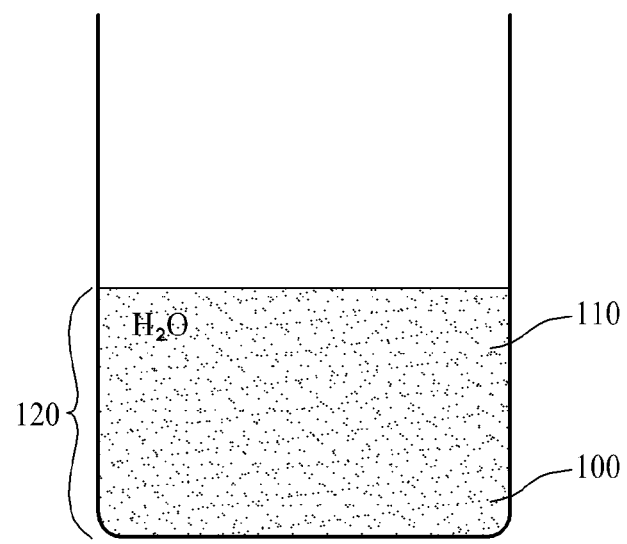
FIG. 4 illustrates dilution of the ethanol solution of FIG. 3 by the addition of water to form a water and ethanol mixture.

The various steps described in FIG. 2 are more fully described in the following paragraphs and the figures that accompany those paragraphs. For example, to assemble the carbon nanotubes at the liquid-liquid interface, the carbon nanotubes are initially assembled at a liquid-liquid interface comprising an organic layer and aqueous (water) layer. This solution, and the liquid-liquid interface, is prepared by suspending the carbon nanotubes 10 into an ethanol solution 100 as shown in FIG. 3. It should be noted that other alcohols may be utilized, for example methanol, isopropyl or other alcohols may be substituted for the ethanol. FIG. 4 illustrates dilution of the ethanol solution 100 by the addition of water 110 to form a water and ethanol mixture 120. Diluted alcohol solutions, such as water and ethanol mixture 120, may sometimes be referred to herein as an aqueous layer.

Figure 5:
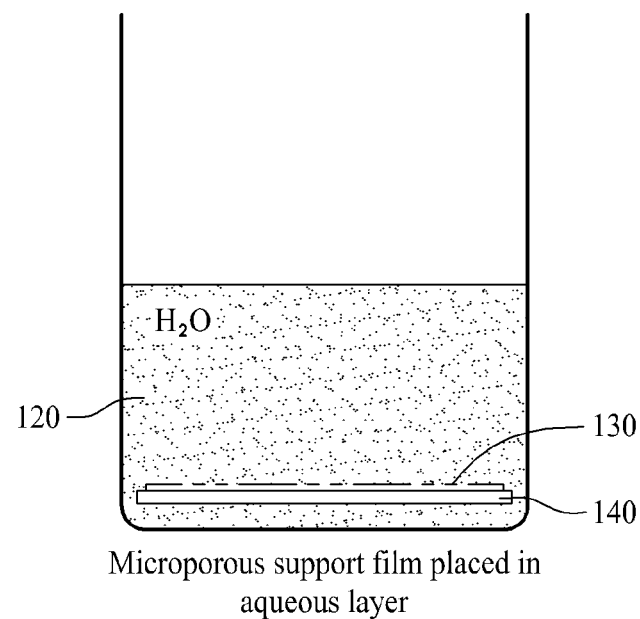
FIG. 5 illustrates, a microporous support film disposed on a backing member and placed in the diluted ethanol solution.
Figure 6:
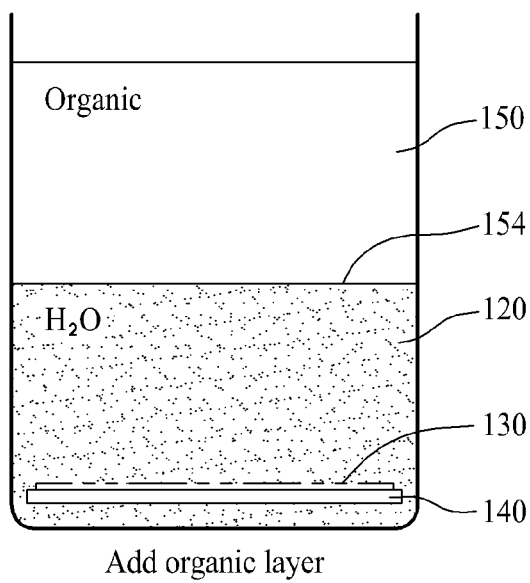
FIG. 6 illustrates addition of a water immiscible organic solvent layer to the diluted ethanol and water solution to form a liquid-liquid interface.

Now referring to FIG. 5, a microporous support film 130 (polysulfone in one embodiment) is disposed on a backing material 140, for example, a polycell foam, and placed within the water and ethanol mixture 120. The water and ethanol mixture 120 may be referred to as an aqueous carbon nanotube suspension, or an aqueous layer. Addition of an organic solvent, or organic layer 150, onto the aqueous carbon nanotube suspension 120 is illustrated in FIG. 6, which forms a liquid-liquid interface 154. In one embodiment, the liquid-liquid interface is referred to as an organic-aqueous interface. The liquid-liquid interface 154 is formed as the organic layer 150 is immiscible with respect to a water and ethanol solution.

Figure 7:
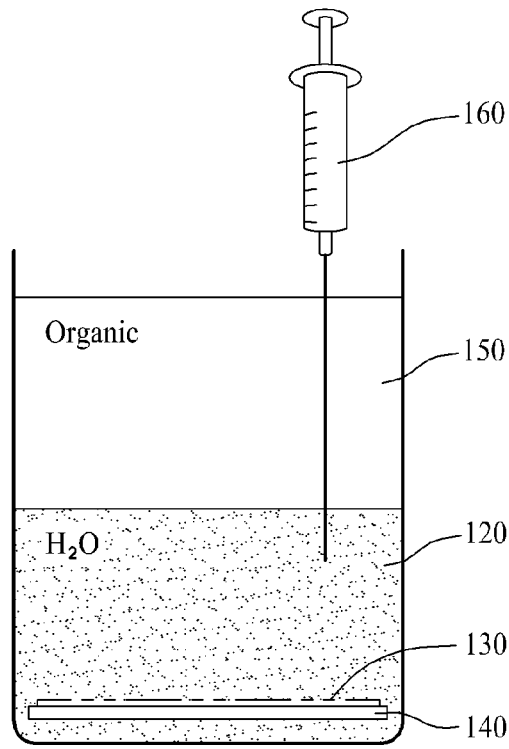
FIG. 7 illustrates a controlled addition of additional ethanol to the diluted ethanol solution causing the carbon nanotubes to align at the liquid-liquid interface.
Figure 8:
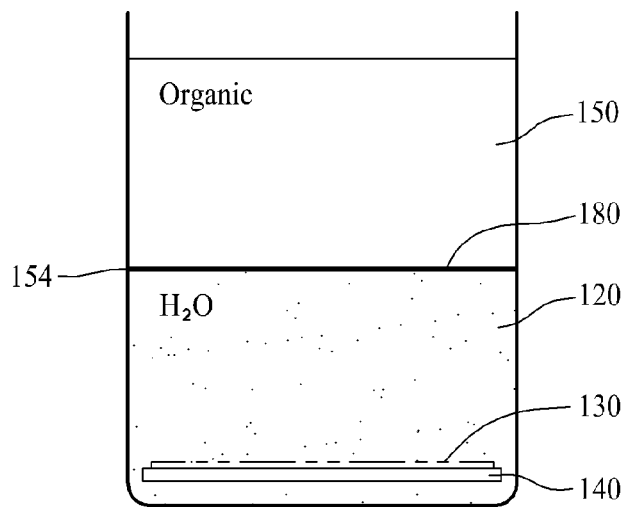
FIG. 8 illustrates an assembled carbon nanotube layer.

FIG. 7 illustrates a controlled addition of additional ethanol 160 to the water and ethanol mixture 120 which causes the carbon nanotubes 10 to align at the liquid-liquid interface 154, thereby forming an assembled carbon nanotube layer 180 as illustrated in FIG. 8.

Figure 9:
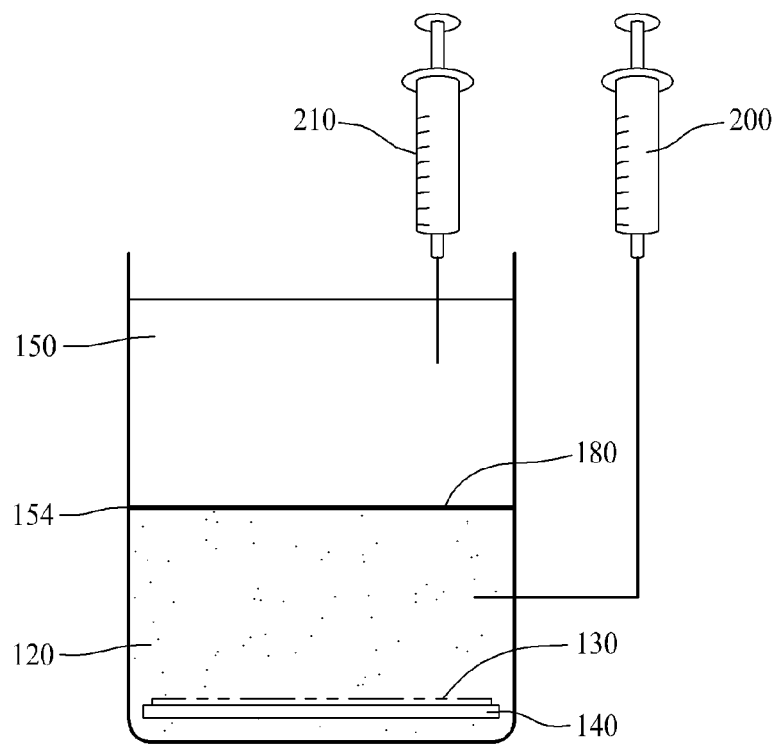
FIG. 9 illustrates the addition of a multifunctional amine component to the diluted ethanol solution and the addition of a multifunctional amine reactive component to the organic layer.

As described above, the next steps are associated with the in situ formation of thin layer selective membrane around the aligned carbon nanotubes 180 at the liquid-liquid interface 154. In one embodiment, illustrated in FIGS. 9 and 10, fabrication of the thin film to encase the assembled carbon nanotube layer 180 is performed utilizing an interfacial technique. Referring specifically to FIG. 9, the aqueous layer (water and ethanol mixture 120) is injected with a multifunctional amine component 200 and the organic layer 150 is injected with a multifunctional amine reactive component 210. The amine component 200 possesses at least two primary amino groups and can be selected from the group consisting of aromatic, aliphatic and alicyclic polyfunctional amines. The amino reactive component 210 possesses at least two amino reactive groups. Preferred amino reactive functional groups include acid halides, and at least one amine reactive compound selected from the group consisting of aromatic, aliphatic, and alicyclic polyfunctional compounds.

Figure 10:
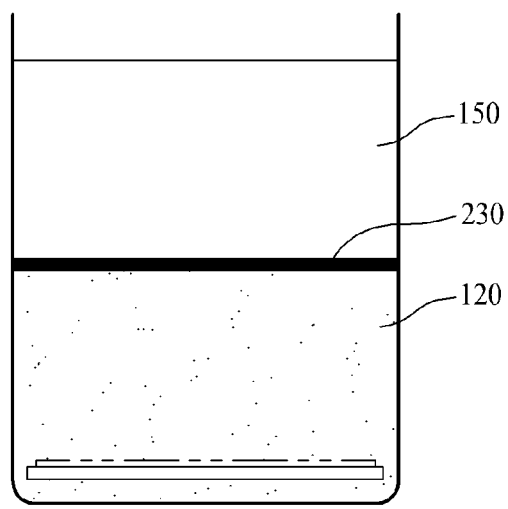
FIG. 10 illustrates spontaneous polymerization at the liquid-liquid interface to form a thin film encasing the previously assembled carbon nanotube layer 180.
Figure 11:
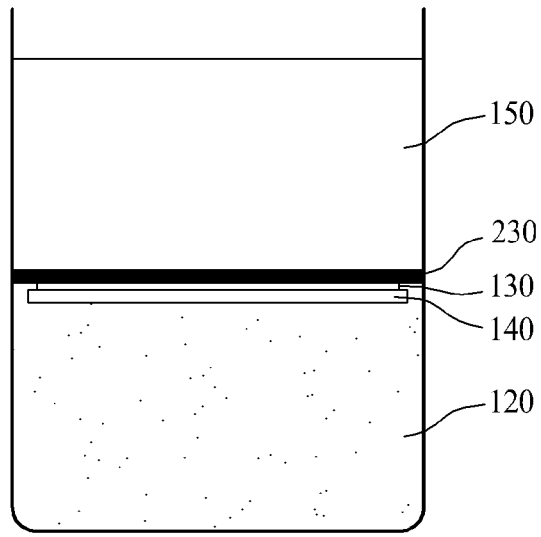
FIG. 11 illustrates transfer of the thin layer membrane/carbon nanotube composite onto a microporous support film configured to provide structural support for the composite.
Figure 12:
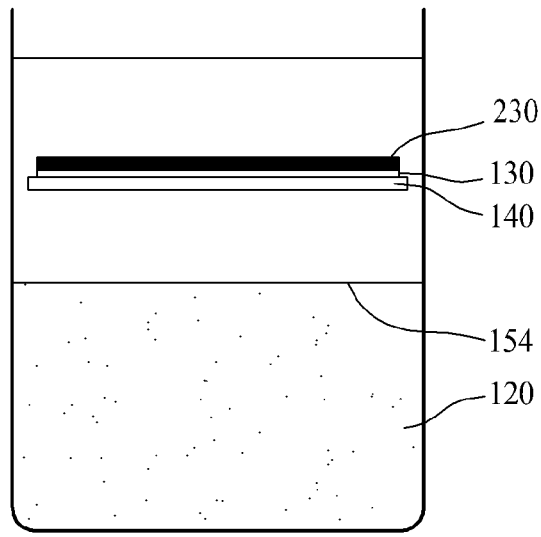
FIG. 12 depicts lamination of the thin layer membrane/carbon nanotube composite to the microporous support film.

The selected reactive components will spontaneously polymerize at the liquid-liquid interface 154 to form a thin film 230 encasing the previously assembled carbon nanotube layer 180 as shown in FIG. 10. The thin film 230 is also referred to herein as a thin layer membrane/carbon nanotube composite 230. FIGS. 11 and 12 illustrate transfer and bonding of the thin layer membrane/carbon nanotube composite 230 onto the underlying structural support layer of microporous support film 130.

Specifically, following formation of the thin layer membrane/carbon nanotube composite 230 at the liquid-liquid interface 154, it is necessary to transfer thin layer membrane/carbon nanotube composite 230 to microporous supporting layer 130. In one embodiment, this transfer is accomplished using an interfacial polymerization scheme to laminate, or bond, the thin layer membrane/carbon nanotube composite 230 to the microporous supporting layer 130.

As described above, after introduction of the aqeuous layer (water and ethanol mixture 120) but before addition of the multifunctional amine component 200, a microporous support 130, supported by a backing material 140, is lowered into the diluted ethanol solution 120. Following the in situ formation of the thin layer membrane/carbon nanotube composite 230 at the liquid-liquid interface 154, the microporous support 130 is slowly raised to come into contact with the thin layer membrane/carbon nanotube composite 230 at the liquid-liquid interface 154 as shown in FIG. 11. Now referring to FIG. 12, the combined microporous support 130 and thin layer membrane/carbon nanotube composite 230 is then raised into the organic layer 150 and held there until sufficient time has passed to interfacially bond the two layers (130 and 230) together through reaction of acid halide species with residual diamine compound. The assembly is then transferred from the organic layer 150, washed, and removed from the solid backing of the polycell foam 140.

Figure 13:
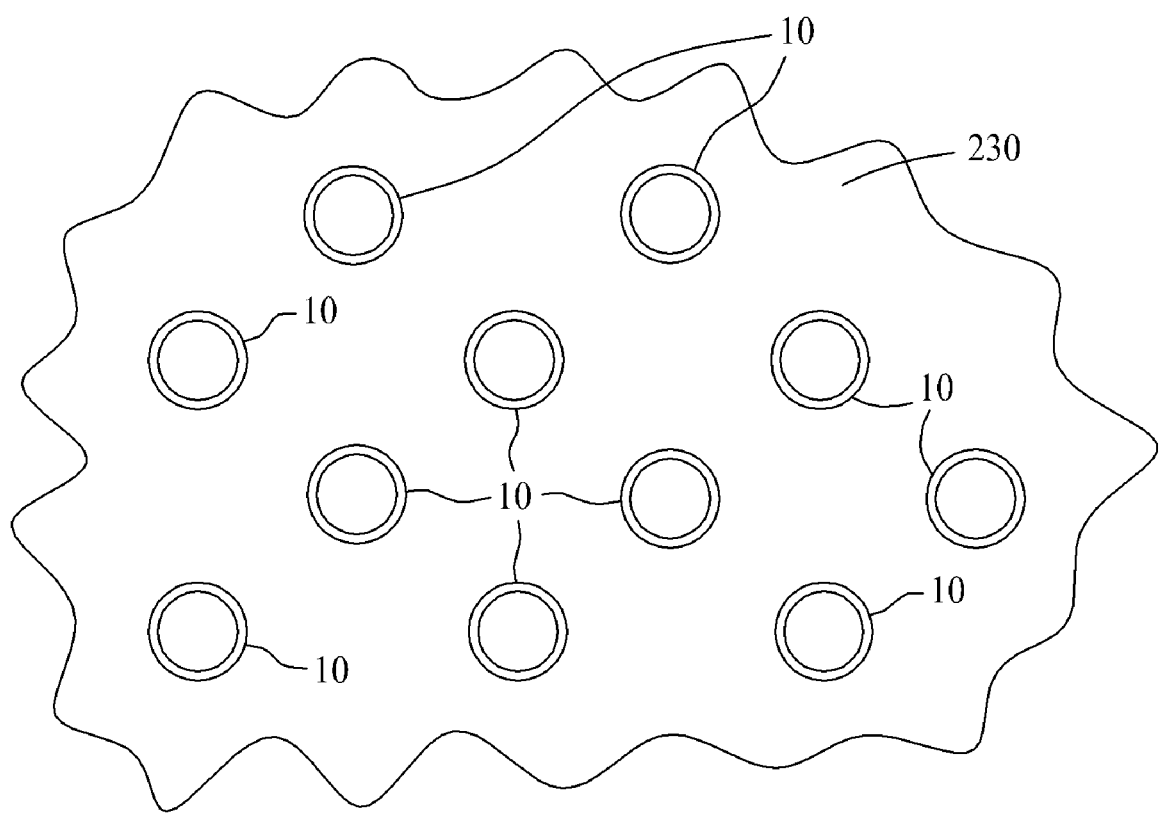
FIG. 13 is a depiction of aligned carbon nanotubes suspended within a reverse osmosis membrane.

FIG. 13 is a depiction of the thin layer membrane/carbon nanotube composite 230 illustrating a plurality of aligned carbon nanotubes 10 suspended therein. The membrane structure of composite 230 is operable to reduce flow resistance and energy input while the fabrication technique described above efficiently incorporates carbon nanotube material into a reverse osmosis membrane.

Alternatively, and as described above, the thin layer selective membrane incorporating aligned carbon nanotubes (composite 230) may be formed using a modified interfacial technique. This technique involves first coating the porous support 130 with a multifunctional amine through dip coating into an amine solution and then drying the support 130. The resulting amine coated porous support can then be placed within the water/ethanol layer 120, passed through the liquid-liquid interface 154 containing the aligned carbon nanotubes 180, and into the organic layer 150 which includes a multifunctional amine reactive compound. This amine reactive compound, in one embodiment, is a multifunctional acid halide species. The transfer of the porous support layer 130 through the liquid-liquid interface 154 and into the reactive organic layer 150 polymerizes a thin layer selective membrane at the surface of the support that efficiently incorporates a plurality of carbon nanotubes 10 that are aligned at the liquid-liquid interface 154.

Incorporation of carbon nanotubes into traditional reverse osmosis membranes produces channels through the membrane that allow low resistance paths for water molecules but prohibit passage of ionic components and other impurities within a water source. The reduction in resistance to flow results in lower pressure required across the membrane and therefore a reduction in the amount of energy required to cause a flow through the membrane. Such a configuration provides a route to efficient organization and consolidation of carbon nanotubes for incorporation into a thin selective reverse osmosis water purification membrane.

In summary, the embodiments describe the combination of aligning carbon nanotubes at an interface, and producing thin semipermeable polymeric membranes encasing the carbon nanotubes in situ at a liquid-liquid interface. The combination described herein provides a route to permeable selective membranes for water purification composed of carbon nanotubes surrounded by a polymer matrix capable of purifying water. The embodiments are distinguishable, since they are capable of purifying seawater and other feed stocks with lower energy consumption. The lower energy consumption is due to lower frictional losses and mechanical pressure requirements needed as compared to current membrane technology. The described embodiments are capable of being readily produced on larger scales and at lower costs than similar carbon nanotube loaded membranes by efficiently concentrating and aligning the carbon nanotubes at a liquid/liquid interface. Through the consolidation of carbon nanotubes at the liquid-liquid interface, a permeable and selective polymer membrane is then capable of being formed in situ around the carbon nanotubes through interfacial polymerization. Such thin film composite selective membranes are primarily useful in the conversion of seawater and brackish waters into potable forms.

As can be discerned from the disclosure, one primary purpose of the described embodiments is the purification of seawater and other brackish water into potable drinking water. Improvements in the performance of these new selective membranes for water purification over current technology include both 1) increased energy efficiency of the membrane and surrounding water purification unit and 2) decreased manufacturing cost and scalability regarding membrane production:

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for fabricating a reverse osmosis membrane, said method comprising:
   aligning a plurality of carbon nanotubes at the interface of two liquids, the first liquid being an aqueous layer, and the second liquid being an organic layer that is immiscible to the aqueous layer;
   forming a thin layer selective membrane around the aligned carbon nanotubes; and
   bonding the thin layer selective membrane/carbon nanotube composite onto a structural support layer;
   wherein aligning a plurality of carbon nanotubes at the interface of two liquids comprises:
      suspending the carbon nanotubes within an alcohol-based solution;
      diluting the alcohol-based solution with water to form an aqueous layer;
      adding an organic layer, immiscible into the aqueous layer, to form the liquid-liquid interface; and
      adding additional alcohol to the aqueous layer at a controlled rate.

2. A method according to claim 1 wherein bonding the thin layer selective membrane/carbon nanotube composite comprises placing a microporous support film into the aqueous layer prior to adding the organic layer.

3. A method according to claim 2 wherein placing a microporous support film into the aqueous layer comprises disposing the microporous support film onto a backing material.

4. A method according to claim 1 wherein suspending the carbon nanotubes within an alcohol-based solution comprises suspending the carbon nanotubes in one of ethanol, methanol, and isopropyl alcohol.

5. A method according to claim 1 wherein forming a thin layer selective membrane around the aligned carbon nanotubes at the interface of the two liquids comprises:
   injecting a multifunctional amine component into the aqueous layer; and
   injecting a multifunctional amine reactive component into the organic layer.

6. A method according to claim 5 wherein injecting a multifunctional amine component into the aqueous layer comprises injecting at least one aromatic, aliphatic or alicyclic polyfunctional amines into the aqueous layer.

7. A method according to claim 5 wherein injecting the organic layer with an amino reactive component comprises injecting at least one multi-functional amine reactive compound into the organic layer.

8. A method according to claim 7 wherein injecting at least one multi-functional amine reactive compound comprises injecting at least one aromatic, aliphatic, or alicyclic polyfunctional compound into the organic layer.

9. A method according to claim 1 wherein forming a thin layer selective membrane around the aligned carbon nanotubes at the interface of the two liquids comprises utilizing an interfacial technique to fabricate a thin film that encases the aligned carbon nanotubes.

10. A method according to claim 1 wherein bonding the thin layer selective membrane/carbon nanotube composite onto a structural support layer comprises utilizing an interfacial polymerization scheme to laminate the thin layer selective membrane/carbon nanotube composite to a microporous supporting layer.

11. A method according to claim 1 wherein bonding the thin layer selective membrane/carbon nanotube composite onto a structural support layer comprises:
   lowering a microporous support into the aqueous layer prior to addition of the organic layer;
   raising the microporous support from the aqueous layer and into contact with the thin layer selective membrane/carbon nanotube composite;
   raising the combined microporous support and thin layer membrane/carbon nanotube composite into the organic layer; and
   holding the combined microporous support and thin layer membrane/carbon nanotube composite within the organic layer until sufficient time has passed to interfacially bond the microporous support and composite.

12. A method according to claim 11 wherein the interfacial bonding occurs through reaction of acid halide species with a residual diamine compound.

13. A method according to claim 1 wherein forming a thin layer selective membrane around the aligned carbon nanotubes comprises:
   coating the structural support layer with a multifunctional amine; and
   exposing the coated structural support layer, with aligned nanotubes thereon, to a multifunction amine reactive compound within the organic layer.

14. A method for fabricating a reverse osmosis membrane, said method comprising:
   suspending carbon nanotubes within an alcohol-based aqueous solution;
   adding additional alcohol to the alcohol-based aqueous solution at a controlled rate such that the carbon nanotubes align at an interface between the alcohol-based aqueous solution and an organic solution; and
   adding at least one first component to the alcohol-based aqueous solution and at least one second component to the organic solution, thereby causing a thin layer selective membrane to form at the interface between the alcohol-based aqueous solution and the organic solution, and about the aligned carbon nanotubes.

15. A method according to claim 14 further comprising bonding a microporous support structure to the thin layer selective membrane.

16. A method according to claim 14 wherein: adding at least one first component to the alcohol-based aqueous solution comprises adding at least one aromatic, aliphatic or alicyclic polyfunctional amine into the alcohol-based aqueous solution; and adding at least one second component to the organic solution comprises adding at least one multifunctional amine reactive compound to the organic solution.

* * * * *